United States Patent
Omidi et al.

(10) Patent No.: US 6,985,072 B2
(45) Date of Patent: Jan. 10, 2006

(54) APPARATUS AND METHOD FOR A LOW-RATE DATA TRANSMISSION MODE OVER A POWER LINE

(75) Inventors: Mohammad Javad Omidi, Mississaugo (CA); Hossein Alavi, Woodbridge (CA); Ahmad Chini, Vaughan (CA); Mohammad Reza Movadhedin, Dubai (AE)

(73) Assignee: Maxim Integrated Products, Inc., Sunnyvale, CA (US)

( * ) Notice: Subject to any disclaimer, the term of this patent is extended or adjusted under 35 U.S.C. 154(b) by 324 days.

(21) Appl. No.: 10/028,078

(22) Filed: Dec. 21, 2001

(65) Prior Publication Data

US 2003/0156012 A1 Aug. 21, 2003

(51) Int. Cl.
*H04M 11/04* (2006.01)

(52) U.S. Cl. .................. 340/310.01; 340/310.02; 340/310.06; 340/310.08; 375/258; 714/752; 370/229

(58) Field of Classification Search ................ 340/310.01–310.08; 375/257, 258, 259; 714/752, 714/776, 754; 370/229
See application file for complete search history.

(56) References Cited

U.S. PATENT DOCUMENTS

| 5,777,544 | A | * | 7/1998 | Vander Mey et al. ... 340/310.06 |
| 6,289,000 | B1 | * | 9/2001 | Yonge, III .................. 370/203 |
| 6,442,129 | B1 | * | 8/2002 | Yonge et al. ............... 370/204 |

OTHER PUBLICATIONS

HomePlug Powerline Alliance; HomePlug 1.0 Specification; pp. ii–139, Jun. 30, 2001.

* cited by examiner

*Primary Examiner*—Donnie L. Crosland
(74) *Attorney, Agent, or Firm*—Blakely, Sokoloff, Taylor & Zafman LLP
M

(57) ABSTRACT

In one embodiment, a system and method for receiving information over a power line in accordance with the HomePlug specification is described. The receiver side of the method involves separation of the data within a payload of an incoming frame into a plurality of blocks. Thereafter, both frame control symbols and data within the blocks are processed by Frame Control Forward Error Correction (FEC) decoding logic.

25 Claims, 7 Drawing Sheets

APPARATUS AND METHOD FOR A LOW-RATE DATA TRANSMISSION MODE OVER A POWER LINE

FIELD

The invention relates to the field of communications. In particular, one embodiment of the invention relates to an apparatus and method providing for low-rate data transmissions over a power line.

GENERAL BACKGROUND

Originally, power line networking was conceived for the networking and high-speed transport of data in small office and home office environments. Recently, a specification entitled "HomePlug 1.0 Specification," was published by the HomePlug Network Alliance. The HomePlug 1.0 Specification provides functions, operations and interface characteristics for high-speed networking based on Orthogonal Frequency Division Multiplexing (OFDM) modulation and using power line wiring as its medium.

The HomePlug 1.0 Specification identifies four modes of operation, all supporting high-rate data transmissions over a power line. These modes of operation include a Robust (ROBO) mode, a Differential Binary Phase Shift Keying (DBPSK) mode and two different speeds of Differential Quadrature Phase Shift Keying ("¼" DQPSK and "¾" DQPSK). For instance, the ROBO mode is a robust form of Differential Binary Phase Shift Keying (DBPSK) that provides extensive time and frequency diversity to improve performance of a system under adverse conditions.

The maximum possible PHY layer payload transmission rate supported by these modes of operation normally ranges from one megabits per second (Mbps) for ROBO mode to 13 megabits per second (Mbps) for DQPSK (¾). These rates are realized by employing an extensive digital signal processor (DSP) computational power at the transmitter and receiver. It is now being realized that the current HomePlug standard fails to provide a low-cost solution to support stations operating at substantially lower data rates such as automation control devices (e.g., home appliances, security and monitoring devices and light/temperature scheduling devices).

The development of a mode of operation that supports low-rate data transmissions without altering operations supported by the current HomePlug standard may be useful for a variety of applications. Also, such development would provide substantial cost savings to allow manufacturers to produce different cost and complexity levels of HomePlug compliant stations.

BRIEF DESCRIPTION OF THE DRAWINGS

The features and advantages of the invention will become apparent from the following detailed description of the invention in which.

DETAILED DESCRIPTION

Figure 1:
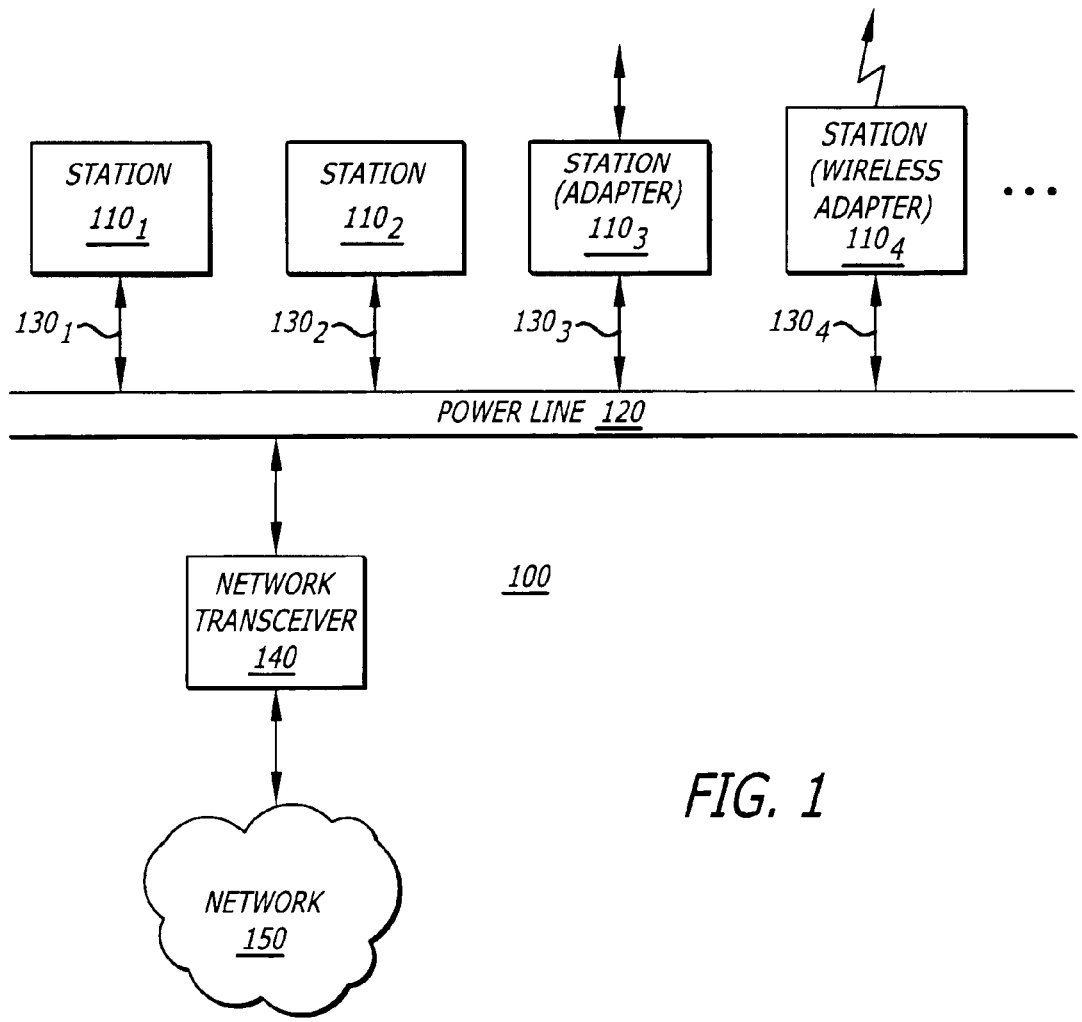
FIG. 1 is an exemplary embodiment of a communication system operating in accordance to the HomePlug standard.

Herein, one embodiment of the invention relates to an apparatus and method for enabling low-rate transmission of information over a power line operating in accordance with the HomePlug standard. This may be accomplished through the creation of a new mode of operation referred to as "low-rate automation control" or (LORA) mode.

HomePlug compliant stations configured to support the LORA mode offer a cost-effective solution. For instance, low-rate HomePlug compliant stations (e.g., network appliances, networked thermostats or lighting controls, etc.) may be configured with logic that exclusively supports a LORA mode of operation. Such logic, namely its controller, analog front-end (AFE), filters and the like would be less complex and thus less costly to produce. Also, if implemented as hardware, such logic would occupy less silicon area.

In the following description, certain terminology is used to describe features of the invention. For instance, a "frame" is generally defined to a particular grouping of data for transport over a power line. Such data may include symbols that enable the transmission of bits of information, namely address, data, control or any combination thereof.

A "power line" is generally defined as one or more physical or virtual links, namely information-carrying mediums to establish a communication pathway. For this embodiment, a power line may be Alternating Current (AC) electrical wiring. Of course, as another embodiment, a power line may be a telephone line (e.g., twisted pair) or another electrical wire type, optical fiber, cable, bus trace, or even a wireless path (e.g., air in combination with wireless signaling technology).

A "HomePlug compliant station" is an electronic device or adapter that is configured to receive data over a power line and transfer data in accordance with current or future HomePlug standards (generically referred to herein as the "HomePlug standard"). The current version of the HomePlug standard is entitled "HomePlug 1.0 Specification," published by the HomePlug Network Alliance on or around Jun. 30, 2001. Examples of certain types of stations include a computer (e.g., a gateway or server, hand-held "PDA", a data terminal, laptop, desktop, etc.), a modem, a set-top box, an automation control device (e.g., network appliance, networked security equipment, networked thermostat, lighting scheduling equipment, etc.), or even a communication device (e.g., telephone, cellular phone, pager, etc.).

Of course, as an adapter, a HomePlug compliant station is configured for either a two or three prong power cord for coupling to a wall socket or perhaps a RJ-11 telephone cord for coupling to an RJ-11 jack. The adapter converts information formatted in accordance with the HomePlug standard into another format readable by another station, which is coupled to the adapter via a connector (e.g., RJ-11 jack, serial port, Universal Serial Bus "USB" port, parallel port or any combination thereof) or through wireless communications. To support a wireless communication scheme, the adapter would employ a wireless transceiver or receiver operating in accordance with a wireless communication protocol (e.g., Bluetooth, HyperLAN/2, IEEE 802.11, etc.).

A HomePlug compliant station comprises "logic," namely hardware, firmware, software or any combination thereof that performs a desired function on input information. For example, in one embodiment, the logic may be adapted as circuitry that performs various operations on a plurality of data blocks. This circuitry may include a "controller" such as a digital signal processor, a general microprocessor, a micro-controller, an application specific integrated circuit (ASIC), a field programmable gate array, a state machine, combinatorial logic or the like.

When implemented as software, the invention is characterized, at least in part, as a series of instructions that, when executed, perform a certain function. The software may be stored in a machine-readable medium, including but not limited to an electronic circuit, a semiconductor memory device, a read only memory (ROM), a flash memory, an erasable ROM (EROM), a floppy diskette, a compact disk, an optical disk, a hard disk, a fiber optic medium, a radio frequency (RF) link or the like. Such software may be executed by the controller.

I. General System Architecture

Referring to FIG. 1, an exemplary embodiment of a communication system operating in accordance to a HomePlug standard is shown. Communication system 100 includes a plurality of stations $110_1$–$110_X$ (X≧1) in communication with each other via a power line 120 routed through an establishment (e.g., residence, apartment building, place of business, etc.). With respect to one embodiment, power line 120 may be an AC power line normally carrying an AC voltage (e.g., 120 VAC to 240 VAC) over which data is transmitted in accordance with the HomePlug standard. For another embodiment, power line 120 may be a telephone line (e.g., twisted pair) over which data is transmitted in accordance with the HomePlug standard.

Stations $110_1$–$110_X$ are coupled to power line 120 via dedicated links $130_1$–$130_X$, which may support wired or wireless communications. These stations $110_1$–$110_X$ exchange information over power line 120 using a plurality of carriers. In general, a "carrier" is an electromagnetic pulse or wave transmitted at a steady base frequency of alternation on which information can be imposed. Of course, when power line 120 is fiber optic medium, the carrier may be a light beam on which information can be imposed.

As shown, different types of stations $110_1$–$110_X$ may be employed in communication system 100. For example, station $110_1$ is a HomePlug compliant station supporting both high-rate and low-rate data transmissions. Hence, HomePlug compliant station $110_1$ may operate in a plurality of operating modes, namely Robust (ROBO) mode, BPSK mode, two different QPSK modes and Low-Rate Automation control (LORA) mode described below. Station $110_2$ is a "low-rate" HomePlug compliant station that exclusively operates in the LORA mode. Station 1103 is an adapter while station $110_4$ is a wireless adapter.

As an optional feature, a network transceiver 140 may be further coupled to power line 120 and provide communications to a network 150 separate and apart from the network formed by power line 120. The network 150 may be employed as a local area network, a wide area network (WAN) such as the Internet or another type of network architecture. The "network transceiver" may include a computer (e.g., gateway, server, etc.), a router, or a switching device for example.

II. Embodiments of HomePlug Compliant Stations

A. General Architecture

Figure 2:
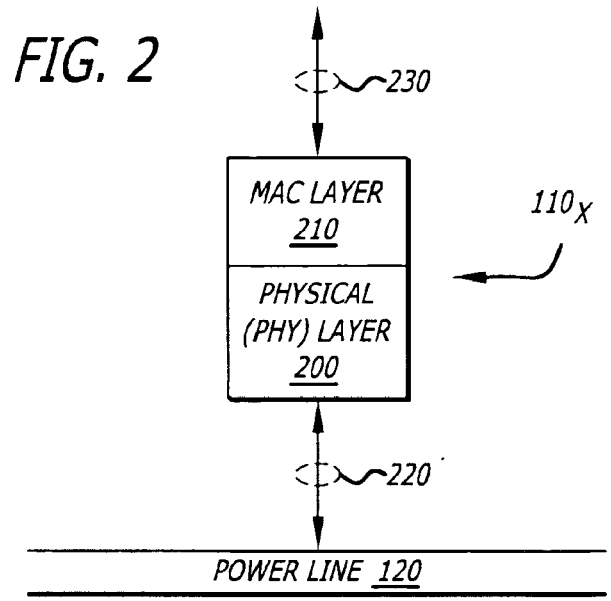
FIG. 2 is a general, exemplary embodiment of a HomePlug compliant station.

Referring to FIG. 2, an exemplary embodiment of a HomePlug compliant station $110_X$ is shown. In general, HomePlug compliant station $110_X$ includes a physical layer (PHY) layer 200 and a media access control (MAC) layer 210. PHY layer 200 comprises logic that is responsible for at least controlling forward error correction, modulation/demodulation and maintaining electrical connections over a wire-side interface 220 associated with power line 120 as needed. MAC layer 210 comprises logic that at least controls segmentation and reassembly of HomePlug frames between PHY layer 200 and a logical interface 230.

Figure 3:
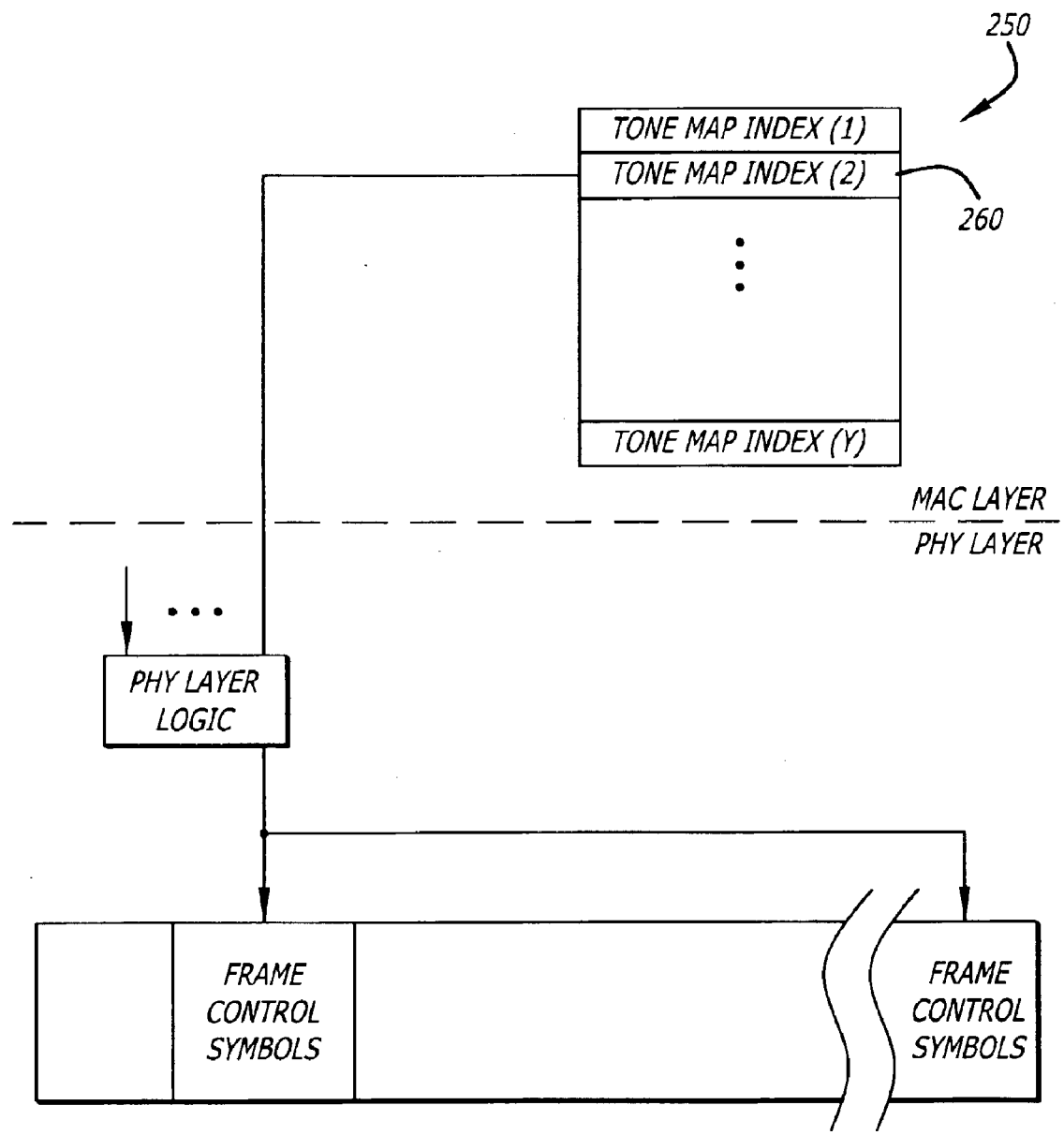
FIG. 3 is an exemplary embodiment illustrative of general operations of logic within a MAC layer of a HomePlug compliant station for tracking channel estimation information.

B. General Use of Tone Map Index in the MAC Layer of a HomePlug Compliant Station Referring to FIG. 3, an exemplary embodiment of a general operations of logic within a MAC layer of any type of HomePlug compliant station is shown. For this embodiment, as an example, the HomePlug compliant station stores a plurality of tone map indices 250. Normally, a "tone map index" is a multi-bit vector that indicates what carriers are reliable for communication with a particular station. For this illustrative embodiment, a tone map index may be a 84-bit vector that indicate which carriers are unreliable.

Herein, one of the tone map indices, namely tone map index 260, is reserved exclusively to identify a HomePlug compliant station is operating and transmitting information in accordance with the LORA mode of operation. The control bits associated with tone map index 260 are loaded with other control information into logic at the PHY layer for placement into frame control symbols of an intermediary frame.

Thus, upon detecting transmissions in the LORA mode, the receiving HomePlug compliant station, if able, operates in LORA mode for that communication session. Otherwise, the transmissions are treated as high-speed data transfers using both Data FEC and Frame Control FEC decoding logic as described in FIG. 6.

In the MAC layer, during LORA mode, a bit transfer rate of approximately 625 kilobits per second (Kbps) is achieved. This is computed by the maximum number (40) of FEC blocks (described below) multiplied by 25 bits carried per FEC block divided by 1.6 milliseconds (i.e. transmission duration for one frame). This differs from ROBO mode that supports 870 Kbps.

C. General TX/RX Operations of a PHY Layer of a First Embodiment of a HomePlug Compliant Station Referring now to FIG. 4, a first exemplary embodiment of general Transmit (TX) operations conducted by logic at the PHY layer of a HomePlug compliant station $110_X$ is shown. The PHY layer logic receives information from MAC layer 210 and produces a HomePlug frame 300. HomePlug frame 300 features a first delimiter 310, a second delimiter 320 and a payload 330.

As shown, first delimiter 310 is used to identify the start of HomePlug frame 300. For this embodiment, first delimiter 310 includes a first frame control field 311 containing a plurality of frame control symbols, such as four (4) OFDM frame control symbols 312–315 for example. Also, first delimiter 310 includes a field 316 for a preamble signal that is placed therein after encoding has been completed.

As further shown, second delimiter 320 includes a second frame control field 321, which again features frame control symbols, namely four (4) OFDM frame control symbols 322–325 for this embodiment. The OFDM frame control symbols 322–325 are used to identify the end of HomePlug frame 300 and may be identical to OFDM symbols placed in first delimiter 310. Second delimiter 320 includes a field 326 for the preamble signal to be placed therein after encoding has been completed.

An embodiment of a frame control field 311 or 321 for delimiters 310 or 320 is shown in Table 1. For example, frame control field 311 enables the transfer of twenty-five (25) bits of control information 327 divided up into a plurality of subfields such as a delimiter type (DT) subfield, variant (VF) subfield and frame control check sequence (FCCS) subfield for example. In one embodiment, one bit of frame control field 311 may be used to signal a receiving HomePlug compliant station to extract certain data bits from the payload for routing over a separate communication channel for enhanced control functionality as described below.

TABLE 1

| Field | Bit Number (Symbol No.) | Bits (Symbol) | Definition |
|---|---|---|---|
| CC | 24 (1) | 1 (1) | Contention Control |
| DT | 23-21 (2) | 3 (2) | Delimiter Type |
| VF | 20-8 (3) | 13 (3) | Variant Field |
| FCCS | 7-0 (4) | 8 (4) | Frame Control Check Sequence |

The DT subfield may be adapted as a 3-bit field that identifies the delimiter and its position relative to the resultant HomePlug frame. The FCCS subfield features a cyclic redundancy check (CRC). For this embodiment, the CRC is 8-bits in length.

Moreover, the VF subfield may be adapted to include a frame length subfield and a tone map index (TMI) subfield. The frame length subfield may be used to indicate the length of the HomePlug frame in terms of the number of 40-symbol Physical (PHY) transmission blocks, followed by zero or one 20-symbol PHY transmission blocks. This allows frame length subfield to cover overall symbol numbers ranging from 20 symbols to 160 symbols for this embodiment. In the ROBO and LORA modes, the number of symbols should be a multiple of 40. The TMI subfield contains an index to the receiving HomePlug compliant station's tone map table for use in encoding and decoding and perhaps LORA mode detection as described below.

Figure 4:
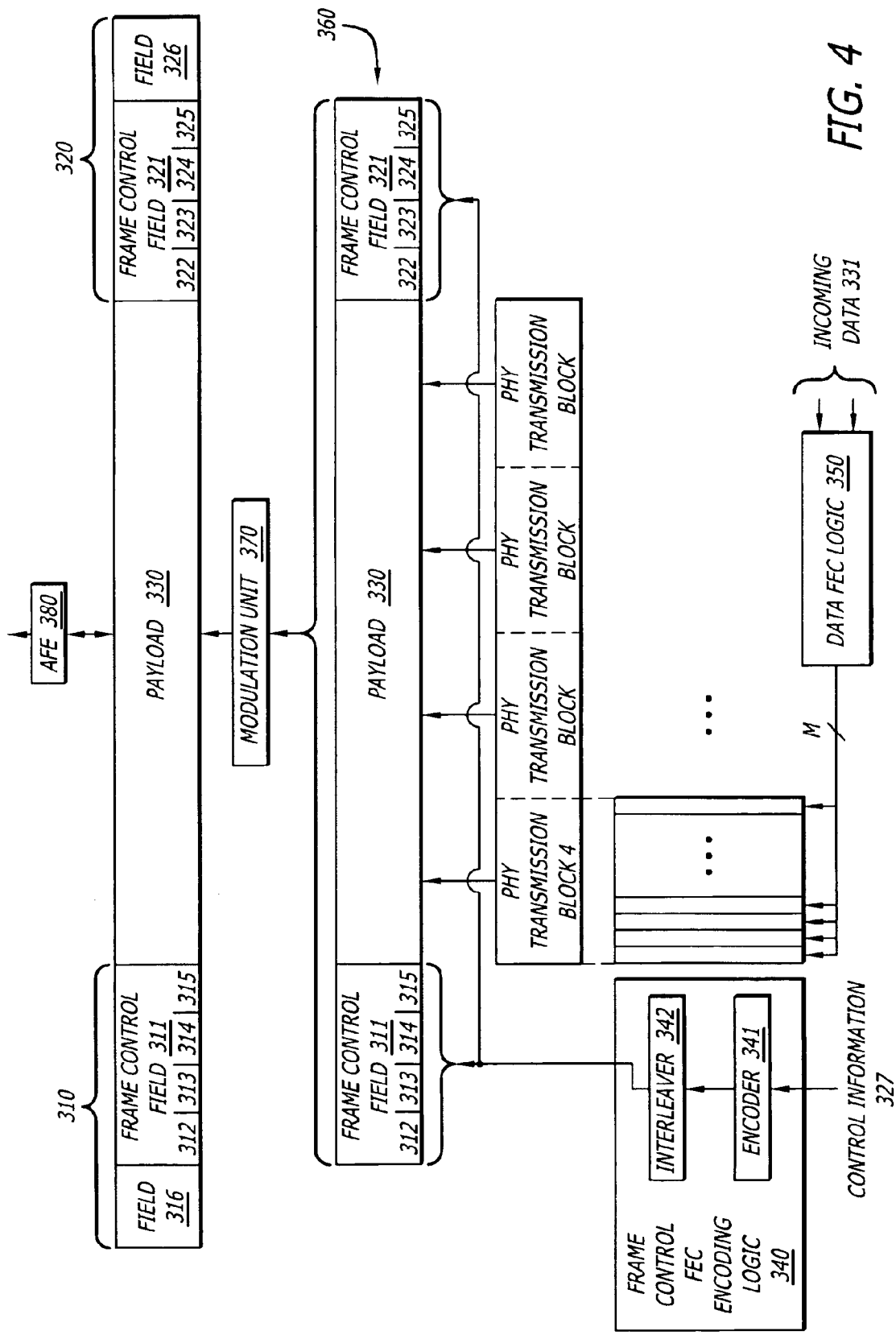
FIG. 4 is an exemplary embodiment of general Transmit (TX) operations conducted by the PHY layer of a first HomePlug compliant station of FIG. 1.

Referring still to FIG. 4, during ROBO mode or another high-speed data transmission mode of operation, control information 327 (e.g., bits associated with the CC, DT, VF and FCCS subfields) is processed by a Frame Control Forward Error Correction (FEC) encoding logic 340 to produce frame control symbols 312–315 and 322–325.

For this embodiment, Frame Control FEC encoding logic 340 includes an encoder 341 and/or a frame control interleaver 342. Encoder 341 may be adapted to encode twenty-five (25) control bits into a 100-bit code word. Frame control interleaver 342 redundantly maps the 100-bits into four (4) symbols of up to 84-bits each. Such operations are described on pages 9–12 of the HomePlug 1.0 Specification.

In addition, during ROBO mode, incoming data 331 to be transmitted from the HomePlug compliant station $110_x$ is processed by different logic referred to as a "Data FEC encoding logic" 350. Data FEC encoding logic 350 is adapted to perform scrambling, Reed-Solomon encoding, convolutional encoding and complex bit interleaving operations on data 331, and thereafter, to load the encoded and/or interleaved data within payload 330. Such operations are described on pages 13–18 of the HomePlug 1.0 Specification.

An intermediary frame 360, produced by the combined outputs of both FEC encoding logic units 340 and 350, is processed by a modulation unit 370 (e.g., an OFDM modulator) to produce the HomePlug frame 300. The HomePlug frame 300 is converted to an analog format by an analog front-end (AFE) 380 before transmission over different channels supported by the power line.

During LORA mode, however, both data 331 and control information 327 are processed by Frame Control FEC encoding logic 340, thereby avoiding usage of scrambler, Reed-Solomon encoder, convolutional encoder and complex bit interleaving.

Figure 5:
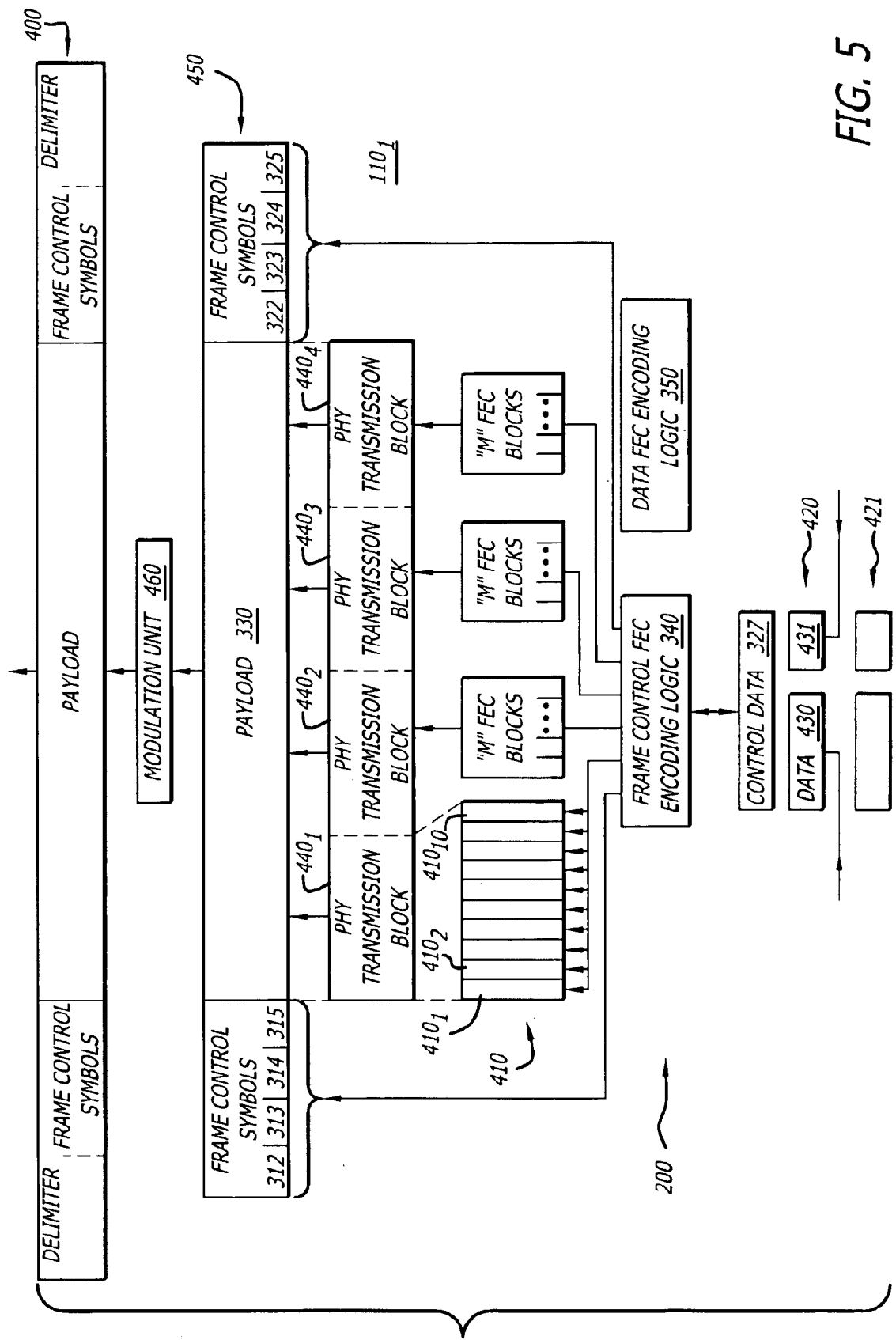
FIG. 5 is an exemplary embodiment of general Transmit (TX) operations conducted by the PHY layer of a HomePlug compliant station of FIG. 1 during LORA mode.

As shown in FIG. 5, control information 327 (e.g., bits associated with the CC, DT, VF and FCCS subfields) is processed by Frame Control FEC encoding logic 340 to produce frame control symbols 312–315 and 322–325 for a HomePlug frame 400. During such processing, the HomePlug compliant station can detect whether such transmissions are in accordance with the LORA mode of operation through analysis of the control information 327 to be transmitted for example.

For this embodiment, Frame Control FEC encoding logic 340 is adapted to detect when HomePlug frame 400 is being transmitted while the HomePlug compliant station is in LORA mode. This may be accomplished by Frame Control FEC encoding logic 340 analyzing control information associated with the TMI subfield, which is carried by frame control symbol 314. In the event that the control information associated with the TMI subfield indicates a specific tone map index used to identify a transmission in LORA mode, all encoding for that communication session is handled by Frame Control FEC encoding logic 340.

In addition, Frame Control FEC encoding logic 340 is further configured to determine the length (in symbols) of payload 330 for HomePlug frame 400. In particular, Frame Control FEC encoding logic 340 is adapted to analyze the control information associated with a length subfield of the VF subfield, which is also carried by frame control symbol 314.

Frame Control FEC encoding logic 340 further receives data destined for payload 330 of HomePlug frame 400. During the LORA mode, multiple FEC blocks 410 are generated by Frame Control FEC encoding logic 340, each FEC block $410_X$ carrying a plurality of input bits. For instance, a first grouping of input bits 420 (e.g., twenty-five "25" input bits) is encoded and/or interleaved for symbol transmission redundancy to produce multiple symbols forming a first FEC block $410_1$. A second grouping of input bits 421 is encoded and/or interleaved to produce multiple symbols forming a second FEC block $410_2$. This process is repeated until all of the FEC blocks 410 are processed.

The input bits associated with each grouping are provided through one or more communication paths. For example, of the 25 input bits associated with first grouping 420, 3 bytes of data 430 are provided over a first path. A final data bit 431, representing the most significant or the least significant bit as shown, is provided through another path, namely a separate communication link carrying information independently from the first path. This data bit 431 may be extracted by the receiving HomePlug compliant station during a communication session and used for additional control functionality as described below.

For example, final data bit 431 can be used as a parity bit to check for validity of data bits 430. Alternatively, final data bit 431 may be used to provide additional information pertaining to the transmitting HomePlug compliant station or any logic implemented therein. This may be accomplished by the Frame Control FEC decoding logic at the receiving HomePlug compliant station extracting final data bit 431 and routing that data bit over a separate communication channel (referred to as a "slow communication channel"). The "slow communication channel" is a virtual parallel path to the communication pathway already established for the transmission of data bits 430.

For instance, information may involve operational status of a transmitting HomePlug compliant station or logic employed therein (e.g., powered on/off, motor speed, measured temperature, etc.). The information may involve sensed state changes of the station. The information may involve any other information deemed relevant to control operations of the transmitting HomePlug compliant station.

It is contemplated that a higher level protocol at the transmitting HomePlug compliant station is used to signal the receiving HomePlug compliant station that slow communication channel is operational. This signaling technique can be accomplished through flag(s) (e.g., flag set within MAC layer software), by setting a selected data bit within one or more successive frame control fields of a delimiter, or by any other technique. If the slow communication channel is not operational, the final data bits associated with all FEC blocks are repeatedly placed in a selected state (e.g., active "1" or inactive "0").

The information carried by the slow communication channel is 40 bits in a frame with 160 OFDM symbols. The rate for such channel would be 40 divided by 1.6 milliseconds, namely 25 Kbps. This allows the slow communication channel to be used for control applications where very low bit rates are required and it can coexist with the main LORA channel over the power line.

After processing multiple FEC blocks, "M" FEC blocks $410_1$–$410_M$ are combined by logic within the PHY layer, normally separate from Frame Control FEC encoding logic 340, to form a PHY transmission block $440_1$. For this embodiment, ten (10) FEC blocks $410_1$–$410_{10}$ are combined to form a PHY transmission block $440_1$. Normally, the size of payload 330 is "N" PHY transmission blocks $440_1$–$440_n$, where "N" ranges from one to four. In the event that a second PHY transmission block $440_2$ is contained in payload 330, it is produced by combining the next series of "M" FEC blocks. This process continues until N×M FEC blocks have been encoded and/or interleaved by Frame Control FEC encoding logic 340 and combined as PHY transmission blocks in forming payload 330 of an intermediary frame 450.

The intermediary frame 450 is modulated by a modulation unit 460 to produce HomePlug frame 400 that is transmitted by an analog front end (not shown) over a power line. As shown, Data FEC encoding logic 350 is not used for any encoding operations during LORA mode.

Figure 6:
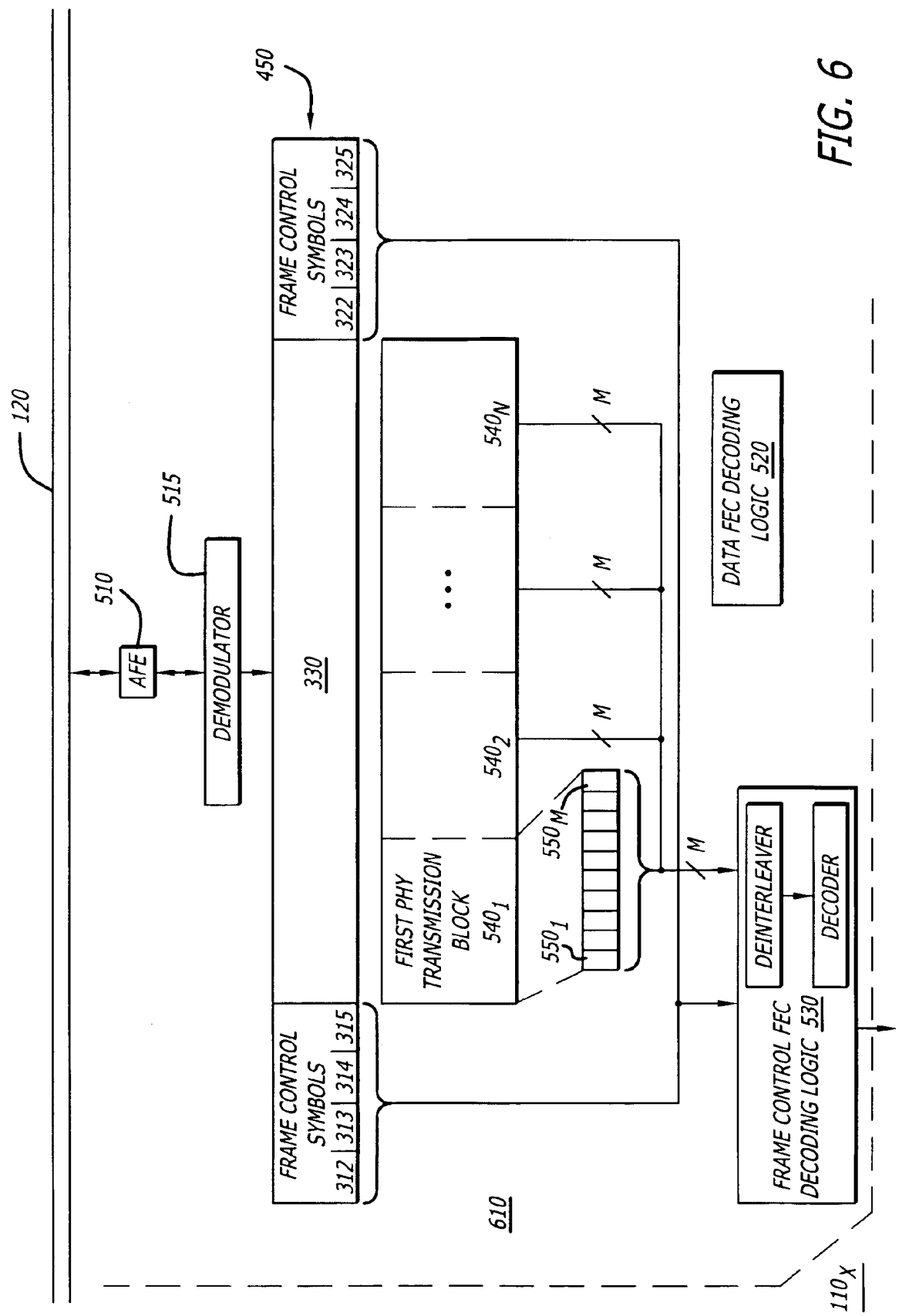
FIG. 6 is an exemplary embodiment of general Receive (RX) operations conducted by a PHY layer of a receiving HomePlug compliant station of FIG. 1 upon detecting transmissions in LORA mode.

Referring now to FIG. 6, general Receive (RX) operations conducted by PHY layer 500 of a receiving HomePlug compliant station $110_X$ of FIG. 2 is shown. Logic of PHY layer 500 receives HomePlug frame 400 over a power line 120. This logic includes an analog front-end (AFE) 510 to place frame 400 into a different form and a demodulator 515 to demodulate the received HomePlug frame 400 in accordance with any type of demodulation scheme such as OFDM demodulation. Thereafter, information associated with demodulated HomePlug frame is routed to Frame Control FEC decoding logic 530 and the information associated with demodulated HomePlug frame is routed to Data FEC decoding logic 520. In case of detection of LORA mode, however, both a payload data 330 and frame control symbols 312–315 and 322–325 of the received frame are routed to the Frame Control FEC decoding logic 530.

For instance, for this embodiment, at least one of frame control symbols (e.g., symbol 314) is de-interleaved and/or decoded to determine whether the incoming HomePlug frame is transmitted by a station operating in LORA mode. Such determination may be accomplished by detecting a specific tone map index carried by frame control symbol 314. Such analysis may be handled by dedicated logic (not shown) or by Frame Control FEC decoding logic 530.

Upon detection that the transmitting HomePlug compliant station is operating in LORA mode, the PHY logic 500 within the receiving HomePlug compliant station de-interleaves and decodes frame control symbols 312–315 as normal and segments data within payload 330 into "N" PHY transmission blocks $540_1$–$540_N$ (N≧1). Each PHY transmission block $540_1, \ldots, 540_N$ is 40-symbols in length for this embodiment. Subsequent or concurrent to the segmentation operation, the data associated with these PHY transmission blocks $540_1$–$540_N$ is processed by Frame Control FEC decoding logic 530.

More specifically, with respect to a first PHY transmission block $540_1$, it is separated into "M" FEC blocks $550_1$–$550_M$. For this embodiment, each FEC block $550_1$–$550_M$ represents four symbols formed by a corresponding encoding/interleaving operation(s). Each of these FEC blocks $550_1$–$550_M$ is separately de-interleaved (if interleaving performed at the transmitting station) and then decoded to recover the input bits. Such de-interleaving and/or decoding occurs for each FEC block $550_1, \ldots, 550_M$ until all of the FEC blocks for first PHY transmission block $540_1$ and subsequent PHY transmission block(s) $540_2, \ldots, 540_N$ have been processed.

In the event receiving HomePlug compliant station $110_X$ detects slow communication channel data (e.g., specific bit recovered from frame control symbols 312–315 is set), one of the bits recovered from each FEC block is separately used for control purposes as briefly described above.

In the PHY layer, during LORA mode, a bit transfer rate of approximately 7600 Kbps is achieved. This is computed by the maximum number of reliable carriers (76) multiplied by the number of symbols within the PHY transmission blocks (160) divided by 1.6 milliseconds (i.e. transmission duration for one frame). This transmission rate is equivalent to stations operating in ROBO mode.

Figure 7:
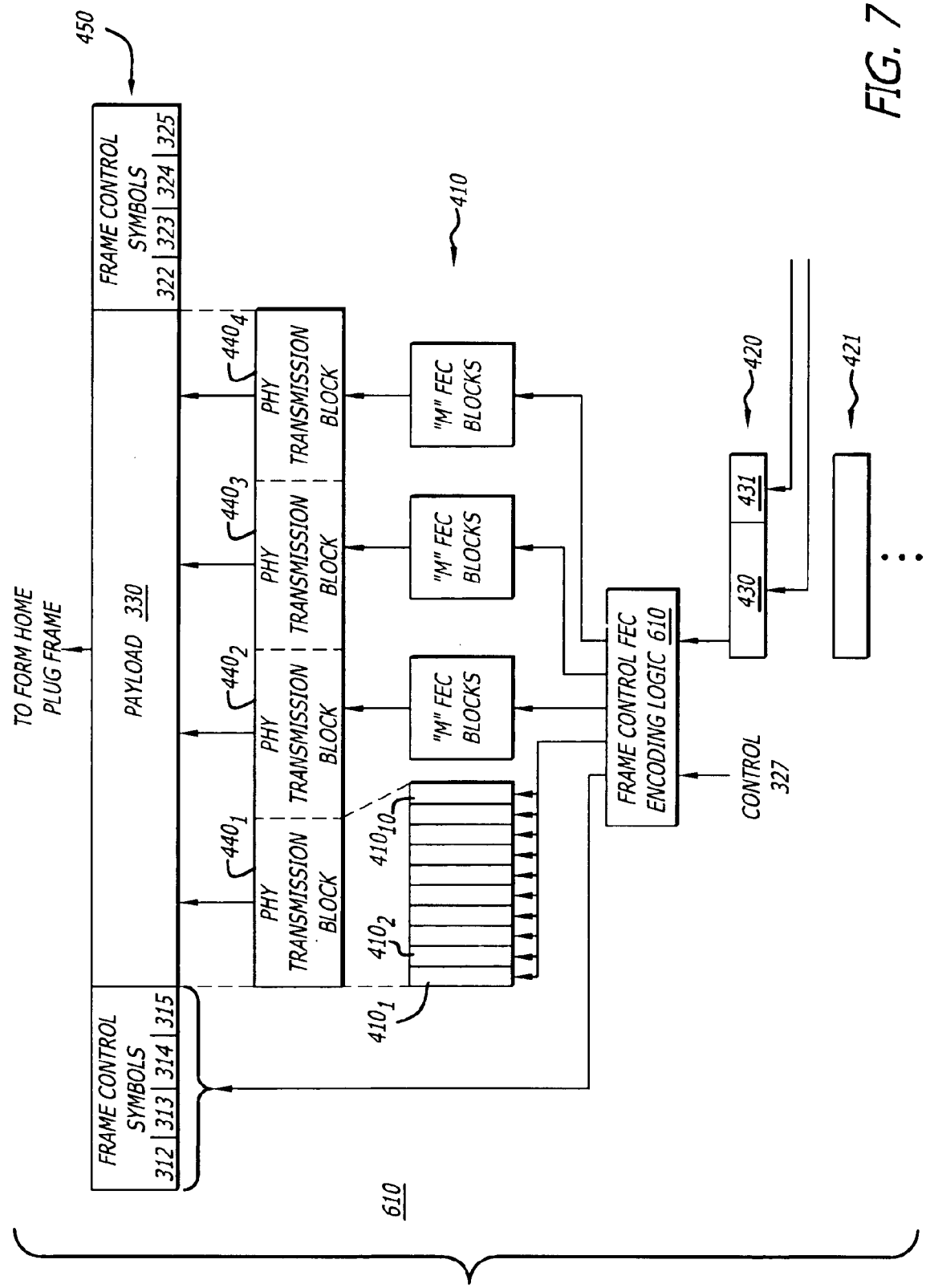
FIG. 7 is an exemplary embodiment of general TX operations conducted by a PHY logic of a low-rate, HomePlug compliant station of FIG. 1.

D. General TX/RX Operations of a PHY Layer of a Second Embodiment of a HomePlug Compliant Station Referring now to FIG. 7, an exemplary embodiment of general TX operations conducted by PHY logic 600 of a low-rate, HomePlug compliant station $110_2$ of FIG. 1 is shown. Logic within a PHY layer 600 of low-rate, HomePlug compliant station $110_2$ comprises Frame Control FEC encoding logic 340 and excludes Data FEC encoding logic. This reduces complexity of the PHY logic and provides cost benefits during manufacture.

As shown, control information 327 (e.g., bits associated with the CC, DT, VF and FCCS subfields) is processed by Frame Control FEC encoding logic 340 to produce frame control symbols 312–315 and 322–325 used by a resultant HomePlug frame (not shown). During such processing, the HomePlug compliant station can detect whether such transmissions are in accordance with the LORA mode of operation by analysis of control information 327.

Herein, Frame Control FEC encoding logic 340 detects that transmissions are being conducted under the LORA mode by analyzing control information 327. In the event that the control information identifies a transmission as being conducted in LORA mode, all encoding for that communication session is handled by Frame Control FEC encoding logic 340.

Frame Control FEC encoding logic 340 is further configured to determine the length (in symbols) of payload 330 for generating the HomePlug frame. One way to accomplish this task is to analyze the control information contained within a length subfield of the VF subfield, which is carried by frame control symbol 314.

Frame Control FEC encoding logic 340 further receives data destined for payload 330 of the HomePlug frame. During the LORA mode, multiple FEC blocks 410 are generated by Frame Control FEC encoding logic 340, each FEC block $410_X$ carrying a plurality of input bits. For instance, a first grouping of input bits 420 (e.g., twenty-five "25" input bits) is encoded and/or to produce multiple symbols forming first FEC block $410_1$. A second grouping of input bits 421 is encoded and/or interleaved to produce multiple symbols forming second FEC block $410_2$. This process is repeated until all of the FEC blocks are processed.

Within each grouping, input bits may be provided over multiple communication paths. For example, for the 25 input bits associated with first grouping 420, three (3) bytes of data 430 are provided independently from final data bit 431. The presence of data bit 431 may be used as an effective technique for providing additional status or other control functionality pertaining to the transmitting HomePlug compliant station.

After processing multiple FEC blocks, "M" FEC blocks $410_1$–$410_M$ are combined to form a PHY transmission block $440_1$. For this embodiment, ten (10) FEC blocks $410_1$–$410_{10}$ are combined to form PHY transmission block $440_1$. In the event that a second PHY transmission block $440_2$ is contained in payload 330, it is produced by combining the next "M" FEC blocks. This process continues until "N" PHY transmission blocks have been filled to produce an intermediary frame 450. Intermediary frame 450 is then modulated to produce a HomePlug frame that is transmitted by an analog front-end over a power line as shown in FIG. 5.

E. General Flowchart for Supporting LORA Mode

Figure 8:
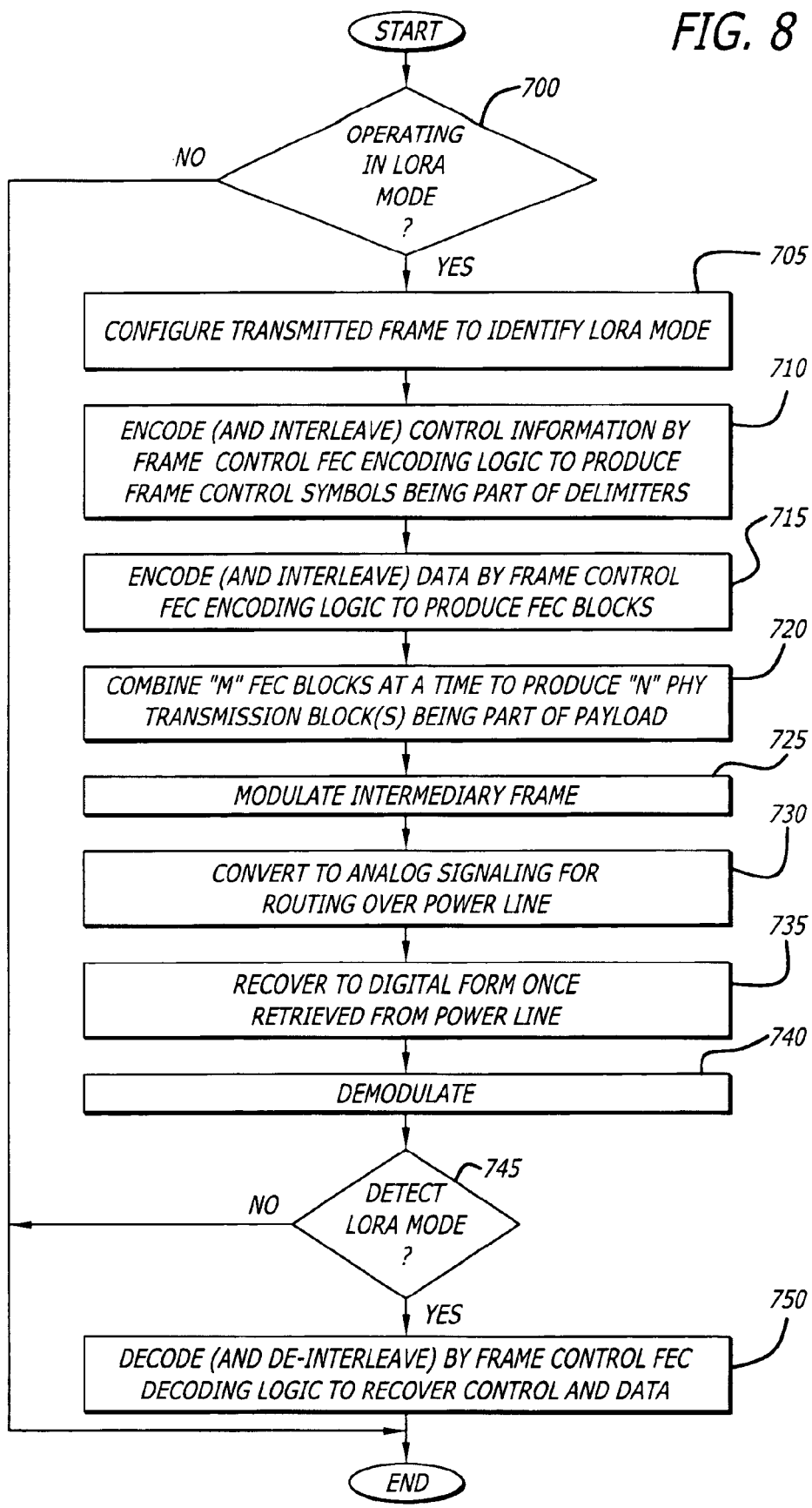
FIG. 8 is an exemplary flowchart of the TX and RX operations for supporting low-rate data transmissions.

Referring to FIG. 8, an exemplary flowchart of the operations for supporting low-rate data transmissions in accordance with the LORA mode is shown. Initially, when operating in LORA mode, the HomePlug compliant station configures a transmitted frame to identify that the transmission is being conducted in the LORA mode (blocks 700 and 705). This may be accomplished by setting control information to be carried by one or more frame control symbols to a specific value.

The control information is encoded and/or interleaved by the Frame Control FEC encoding logic to produce the frame control symbols (block 710). Similarly, data destined for the payload is encoded and/or interleaved by the Frame Control FEC encoding logic to produce FEC blocks (block 715). Multiple FEC blocks are combined to produce one PHY transmission block. One of more PHY transmission blocks form the payload of the frame (block 720). If there are an insufficient number of FEC blocks to provide a full PHY transmission pad, padding may be provided. For this embodiment, the frame control symbols and payload are modulated to produce a HomePlug frame (block 725), which is normally converted to an analog form for routing over the power line (block 730).

At the receiving HomePlug compliant station, the analog signals forming the HomePlug frame are recovered and placed the HomePlug frame into a digital form (block 735). The recovered HomePlug frame is demodulated and the transmission is analyzed to determine if the communication session under LORA mode is requested (blocks 740 and 745). This may involve the Frame Control FEC decoding logic to de-interleave and/or decode one or more of the frame control symbols. If LORA mode is detected for this communication session, the remainder of the frame control symbols (if not all de-interleaved and decided) and data within the payload are de-interleaved and/or decoded to recover the control bits and the input data bits (block 750).

While certain exemplary embodiments have been described and shown in the accompanying drawings, it is to be understood that such embodiments are merely illustrative of the invention in order to provide a thorough understanding of the invention. Also, well-known circuits are not set forth in detail in order to avoid unnecessarily obscuring the invention.

What is claimed is:

1. A method for receiving information over a power line, comprising:
   separating the data within a payload of an incoming frame into a plurality of blocks, the incoming frame including frame control symbols and data; and
   processing both the frame control symbols and the data within the blocks by Frame Control Forward Error Correction (FEC) decoding logic, the processing of both the frame control symbols and data of the payload are conducted by de-interleaving and decoding operations.

2. The method of claim 1 further comprising separating data bits recovered from each block for transmission over at least two different communication paths.

3. The method of claim 1, wherein each of the plurality of blocks being equal in length.

4. The method of claim 1, wherein the separating of the data comprises:
   separating the payload into at least two physical transmission blocks; and
   separating each of the at least two physical transmission blocks into the plurality of blocks, each block having a length less than one-half a length of the physical transmission block.

5. The method of claim 4, where the length of each physical transmission block being approximately forty symbols.

6. The method of claim 5, wherein the length of each block being approximately four symbols.

7. The method of claim 6, wherein the four symbols of each block carry a plurality of input bits.

8. The method of claim 1, wherein the processing of both the frame control symbols and the data within the blocks by Frame Control FEC decoding logic includes extracting at least one data bit from a block of the plurality of blocks and routing the at least one data bit over a communication channel separate from a communication channel over which remaining bits of the block are routed.

9. The method of claim 1, prior to conducting at least one of the de-interleaving and decoding operations on the data, the method further comprises:
   recovering at least one bit from one of the frame control symbols to detect whether the frame is being transmitted in accordance with a low-rate automation control (LORA) mode.

10. The method of claim 8, wherein the at least one bit is a single bit for the block and each block of the plurality of blocks.

11. A method comprising:
   determining whether a HomePlug compliant station is operating in a low-rate automation control (LORA) mode;
   encoding both control information and data within a Frame Control Forward Error Correction (FEC) encoding logic if the HomePlug compliant station is operating in the LORA mode; and
   upon determining that the HomePlug compliant station is not operating in the LORA mode,
      producing frame control symbols for a frame by the Frame Control FEC encoding logic, and
      producing data corresponding to a payload of the frame by a Data FEC encoding logic.

12. The method of claim 11, wherein the determination whether the HomePlug compliant station is operating in the LORA mode comprises determining whether a predetermined tone map index is part of the control information.

13. The method of claim 11, wherein the data being encoded is received over at least two communication paths, at least one bit from each of the plurality of blocks is received over a first communication path while the remaining twenty-four input bits of each of a plurality of blocks is received over a second communication path.

14. The method of claim 13 further comprising:
   placing the encoded data within a HomePlug frame; and
   transmitting the HomePlug frame over the power line via a primary channel.

15. The method of claim 14 further comprising:
   placing the at least one bit from each of the plurality of blocks into a frame for transmission over the power line via a secondary channel.

16. Software embodied in a machine-readable medium and executed by a processor, comprising:
   a first software module to separate data within a payload of an incoming frame into a plurality of blocks, the incoming frame including frame control symbols and data; and
   a second software module to process both the frame control symbols and the data within the blocks by conducting de-interleaving and decoding operations, the second software module operating as a Frame Control Forward Error Correction (FEC) decoding logic.

17. A HomePlug compliant station comprising:
   a media access control (MAC) layer; and
   a physical layer in communication with the MAC layer, the physical layer including a Frame Control Forward Error Correction (FEC) encoding logic to encode and interleave both data and control information associated with a frame during a first mode of operation and a data FEC encoding logic that, during a second mode of operation, encodes and interleaves the data while the Frame Control FEC encoding logic encodes and interleaves only the control information.

18. The HomePlug compliant station of claim 17, wherein the control information includes a tone map index value.

19. The HomePlug compliant station of claim 17, wherein the Frame Control FEC encoding logic (i) determining a mode of operation of the HomePlug compliant station, and (ii) encoding the control information and data in an iterative manner.

20. The HomePlug compliant station of claim 17, wherein the Frame Control FEC encoding logic (i) determining a mode of operation of the station, (ii) encoding and interleaving the data to produce a plurality of blocks and the control information to produce frame control symbols, (III) combining multiple blocks, each being generally equivalent in size to four symbols to produce at least two physical transmission blocks, and (iv) combining the at least two physical transmission blocks being generally equivalent in size to forty symbols, to produce a payload of an outgoing frame.

21. A HomePlug compliant station comprising:
   a receiver to retrieve an incoming frame from a power line; and
   a Frame Control Forward Error Correction (FEC) decoding logic, coupled to the receiver, to de-interleave and decode both data and control information associated with the incoming frame during a first mode of operation and to de-interleave and decode only the control information during a second mode of operation.

22. The HomePlug compliant station of claim 21 further comprising:
   a data FEC encoding logic to de-interleave and decode only the data associated with the incoming frame while the Frame Control FEC decoding logic de-interleaves and decodes only the control information associated with the incoming frame when the station is operating in the second mode of operation.

23. The HomePlug compliant station of claim 21, wherein the data is contained within the payload of the incoming frame.

24. The HomePlug compliant station of claim 23, wherein the Frame Control FEC encoding logic (i) determining a mode of operation associated with a transmitting station, (ii) separating the data of the payload into a plurality of physical transmission blocks, each of the physical transmission blocks being generally equivalent in size to forty symbols, (iii) separating each of the physical transmission blocks into the plurality of blocks, each of the plurality of blocks being equivalent in size to four symbols, arid (iv) de-interleaving and decoding the symbols within each of the plurality of blocks by the Frame Control FEC decoding logic to recover the data when the determined mode of operation is the first mode of operation.

25. The HomePlug compliant station of claim 21, wherein the Frame Control FEC decoding logic extracting at least one data bit from a predetermined data block of the data and routing the at least one data bit over a communication channel separate from a communication channel used for routing remaining data bits of the data block.

* * * * *